United States Patent
Itoh et al.

(10) Patent No.: US 7,210,013 B2
(45) Date of Patent: Apr. 24, 2007

(54) DATA PROTECTION FOR COMPUTER SYSTEM

(75) Inventors: Kishiko Itoh, Tokyo (JP); Hiroaki Mine, Yamato (JP); Ken Sasaki, Yamato (JP)

(73) Assignee: Lenovo Singapore Pte, Ltd, Singapore (SG)

( * ) Notice: Subject to any disclaimer, the term of this patent is extended or adjusted under 35 U.S.C. 154(b) by 422 days.

(21) Appl. No.: 10/766,340

(22) Filed: Jan. 28, 2004

(65) Prior Publication Data

US 2004/0243759 A1    Dec. 2, 2004

(30) Foreign Application Priority Data

Jan. 28, 2003   (JP)   ............... 2003-018309

(51) Int. Cl.
  *G06F 12/16*   (2006.01)
(52) U.S. Cl. ............... 711/163; 711/173; 711/165
(58) Field of Classification Search ............ 711/163, 711/173, 165
See application file for complete search history.

(56) References Cited

U.S. PATENT DOCUMENTS

| | | | |
|---|---|---|---|
| 6,473,655 B1 * | 10/2002 | Gould et al. | 700/5 |
| 6,711,660 B1 * | 3/2004 | Milne et al. | 711/173 |
| 6,892,255 B2 * | 5/2005 | Teshima | 710/74 |
| 2003/0014619 A1 * | 1/2003 | Cheston et al. | 713/1 |
| 2003/0051090 A1 * | 3/2003 | Bonnett et al. | 711/1 |
| 2003/0182500 A1 * | 9/2003 | Raves et al. | 711/113 |

FOREIGN PATENT DOCUMENTS

JP    2001-306266    11/2001

OTHER PUBLICATIONS

Hennessy et al. "Computer Organization and Design: The Hardware/Software Interface," Morgan Kaufmann Publishers, Inc., 1998, pp. 579-586.*

* cited by examiner

*Primary Examiner*—Matthew Kim
*Assistant Examiner*—Shane M Thomas
(74) *Attorney, Agent, or Firm*—Sawyer Law Group LLP; Carlos Munoz-Bustamante

(57) ABSTRACT

For a hard disk drive divided into a user area that is an area operating in a user environment, and a host protected area that is an area protected from a user, provided are: a basic input/output system which supports a boot from the host protected area as well as supports a validation, for a system vendor authentication, of a Protected Area Run Time Interface Extension Services application stored in the host protected area; and a Protected Area Run Time Interface Extension Services application access module which generates a virtual Protected Area Run Time Interface Extension Services application area by copying the Protected Area Run Time Interface Extension Services application onto an unoccupied area of a memory.

15 Claims, 7 Drawing Sheets

DATA PROTECTION FOR COMPUTER SYSTEM

BACKGROUND OF THE INVENTION

The present invention relates to a computer system including a storage device such as a hard disk drive (HDD), and to a computer apparatus, a data protection method for the storage device, and a program. More specifically, the present invention relates to a computer system including a storage device having a user area operating in a predetermined user environment and an area hidden from a user, and to a computer apparatus, a data protection method for the storage device, and a program.

Conventionally, in a hard disk drive (HDD) which supports a specification of AT Attachment (ATA)/Advanced Technology Attachment Packet Interface (ATAPI)-5, which is a standard in the industry, it is possible to generate an area hidden from a user, that is, an area that cannot be freely accessed by the user, by use of a function of the hard disk and an architecture of Protected Area Run Time Interface Extension Services (PARTIES), which is a standard of the American National Standards Institute (ANSI).

FIG. 7 is a diagram for explaining the function of the PARTIES in the HDD, showing an image in which an area of the HDD is laterally cut into sections. Here, a value of "Max" that is a virtual maximum area is defined. In a normal command, an area to this "Max" is given, and an operating system (OS) uses an area from "Start" to "Max." An area from the value of this "Max" to "Native Max," which is a true maximum area, is a PARTIES partition. In "Boot Engineering Extension Record" of which the standard is determined/defined in this PARTIES partition, information contained in the PARTIES partition is stored. By referring to the above-described "Record," a variety of functions for the PARTIES partition can be used.

As usage assumed for the PARTIES specification, there is a service, in which an A drive usually assigned when a computer is booted from a removable medium such as a floppy disk is also assigned when the computer is booted from the PARTIES partition, and the PARTIES partition is accessed, for example, by using a basic input/output system (BIOS) call for the removable medium, which is called Interrupt 40 of the BIOS. Specifically, a system is configured such that the A drive is seen and a user partition that is a normal area is seen as a C drive when the computer is booted from the PARTIES partition. In such a way, a preload image of the OS can be previously stored in an area of PARTIES, thus enabling a recovery therefrom. Moreover, information required for setting of hardware, setting of a password, description of a boot sequence, and the like, which are BIOS setups, is stored in the above-described area in place of a ROM, thus enabling, for example, setup work by a user, which uses a graphical user interface. Moreover, it is also assumed, as the PARTIES specification, that a boot (activation) program is previously stored in the area, and the system is diagnosed therefrom.

In addition, though not being directly associated with the invention of this application, as a conventional technology of data protection for the hard disk, there is a technology of processing an inputted pass phrase by a hash function to protect data in the HDD (for example, refer to Patent Document 1).

(Patent Document 1)
Japanese Patent Laid-Open No. 2001-306266 (p. 3, FIG. 1)

By use of such ATA/ATAPI-5 and ANSI PARTIES as described above, it is possible to write-protect a PARTIES partition desired to be write-protected and to put limitations on a change of the data by an application introduced into the PARTIES partition. However, in the case of executing the application on the PARTIES partition, it is difficult to put limitations on read and write of the application only by current technologies because the application itself is present in the PARTIES partition.

Here, in order to authenticate a system vendor (owner who has generated and written the application), the contents of the application on the PARTIES partition are validated by use of a private key in the BIOS, such as the hash function. Accordingly, when the contents of the application are changed, namely, when the application on the PARTIES partition is executed and the write is performed thereon, the application is regarded as an incorrect application that is not validated, which causes an error at the time of activating the application. The HDD does not have a function to write-protect only a certain area, and in the case of developing the partition for PARTIES, it is necessary to realize a write protection with much concern for the write limitations.

SUMMARY OF THE INVENTION

The present invention has been made in order to solve the technical challenges as described above. It is a purpose of the present invention to realize write limitations on data stored in an area hidden from a user in a storage device such as, for example, an HDD.

It is another purpose of the present invention to perform the write limitations, for example, without changing or developing a special application for a PARTIES partition.

It is still another purpose of the present invention to make it possible to deal with, for example, unexpected write to the application on the PARTIES partition in the HDD even without a special handling therewith.

It is yet another purpose of the present invention to expand a usable range of the PARTIES specification.

In order to attain such purposes as described above, a computer system to which the present invention is applied write-protects a PARTIES partition desired to be write-protected by use of the ATA/ATAPI-5 and the ANSI PARTIES, and limits the change of data by the application introduced in the PARTIES partition. Specifically, the computer system to which the present invention is applied meets, for example, a PARTIES specification or a standard specification conforming thereto. Moreover, the computer system includes: a storage device having a user area which operates in a user environment and a hidden area (for example, PARTIES partition) which stores an application requiring a write protection; and a memory configured to be able to develop the application stored in the hidden area of the storage device, the memory providing a virtual disk space. Here, the computer system can be characterized in that, in the storage device, a boot from the hidden area is executed with a support of a BIOS.

Moreover, the present invention is a computer system including a storage device for retaining data. The computer system is characterized in that the storage device includes: a first partition (user area) which is an area operating in a user environment; and a second partition (PARTIES partition, host protected area) that is a different area from the first partition and storing applications requiring write protection.

The computer system is also characterized in that the second partition includes an unoccupied area in which a specific application is able to be developed when the specific application is executed from among the applications requiring the write protection.

Meanwhile, the present invention is a computer system including an external storage device which is able to form a first area operating in a user environment and a second area that is an area hidden from a user. The computer system supports a boot of a predetermined application among applications stored in the second area by boot supporting mechanism, validates the predetermined application for a system vendor authentication by validating mechanism, and by virtual application area forming mechanism, copies the predetermined application onto an unoccupied area on a predetermined memory or an unoccupied area of the second area and forms a virtual application area when the predetermined application is the validated application. Then, the computer system can be characterized in that an access to the predetermined application is performed for the virtual application area.

Here, the computer system is characterized in that the virtual application area forming mechanism detects the size of the predetermined application, searches and secures the unoccupied area on the predetermined memory or the unoccupied area of the second area, and then forms the virtual application area. Moreover, the computer system can be characterized in that, when the virtual application area is formed in the second area, the virtual application area forming mechanism detects a size of the predetermined application, requests a BIOS to unlock the second area, and then forms the virtual application area in the second area.

Viewed from another vantage point, the present invention is a computer apparatus which accesses a storage device for retaining data such as an HDD, the storage device being divided into a user area operating in a user environment and a host protected area protected from a user, the apparatus including: a basic input/output system (BIOS) which supports a boot from the host protected area and supports the validation of an application in the host protected area for a system vendor authentication; and an application access module which copies the application in the host protected area onto an unoccupied area of another memory or an unoccupied area of the host protected area, thus generating a virtual application area.

Here, the computer apparatus is characterized in that the BIOS manages a private key and/or an access to the host protected area. Moreover, the computer apparatus can be characterized in that the application access module determines whether or not the application in the host protected area is one that has been write-protected, and when the application is accessed, accesses the virtual application area.

Furthermore, the present invention is a data protection method for a storage device for retaining data, the storage device having a first area which operates in a user environment and a second area that is an area hidden from a user, the method including the steps of: determining whether or not a predetermined application in the second area is an application validated by a system vendor when booting a predetermined application in the second area; detecting whether or not a write protection is required for the predetermined application when the predetermined application is the validated application; unlocking the second area; reading the predetermined application from the unlocked second area; locking the unlocked second area; copying the read predetermined application onto a virtual application area formed in an unoccupied area on another memory; and reading a first code for booting the predetermined application from the virtual application area.

Viewed from another vantage point, the data protection method for a storage device, to which the present invention is applied, includes the steps of: unlocking a second area when booting a validated application in the second area; reading the application from the unlocked second area; copying the read application onto a virtual application area provided in an unoccupied area in the second area; and reading a first code for booting the application from the virtual application area. Here, suppose that the data protection method is characterized in that the step of reading a first code reads the first code from the virtual application area by directing an access range of a disk access program toward an area onto which the application has been copied. Then, this is preferable because the write protection of the PARTIES partition desired to be write-protected can be realized.

Here, the present invention can be grasped as a program for allowing a computer to realize predetermined functions. Specifically, the program to which the present invention is applied allows the computer, which includes a first area that is an operating environment for a user and a second area that is an area hidden from the user, to realize: a function to request unlocking of the second area; a function to read, from the unlocked second area, an application which is validated by a system vendor and requires a write protection; a function to request locking of the unlocked second area; a function to copy the read application onto a virtual application area provided in an unoccupied area on a memory different from the storage device; and a function to boot the application from the virtual application area.

Moreover, the program to which the present invention is applied allows a computer to realize: a function to request unlocking of a second area; a function to read, from the unlocked second area, an application which is validated by a system vendor and requires a write protection; a function to copy the read application onto a virtual application area provided in an unoccupied area of the second area; and a function to direct an access to the application toward the virtual application area, for example, by changing an address of an access table for the application to an address of a copy destination.

Note that, with regard to these programs, it is conceivable to provide the programs allowed to be executed in a computer-readable recording medium by the computer as well as in a state where the programs are installed in the computer apparatus when the computer apparatus is provided to a customer. As such a recording medium, for example, a CD-ROM or the like is applicable, and the programs are read by a CD-ROM reading device or the like and then executed. Moreover, there is another mode in which these programs are provided, for example, by a program transmitting device through a network. Such a program transmitting device includes, for example, a memory for storing the programs, the memory being provided in a host server, and program transmitting mechanism for providing the programs through the network.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

The present invention will be described in detail below based on embodiments shown in the accompanying drawings.

(Embodiment 1)

Figure 1:
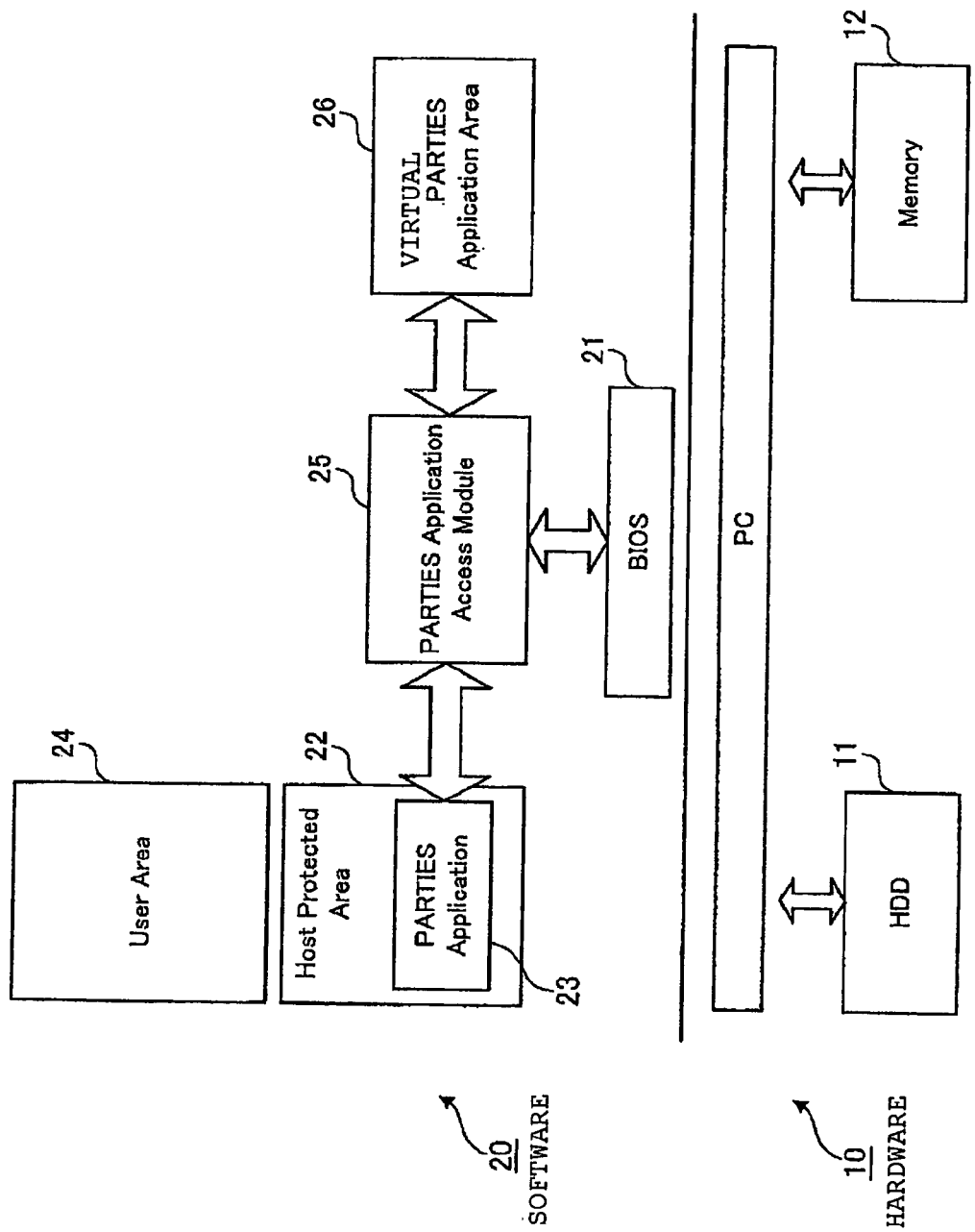
FIG. 1 is a diagram showing an entire configuration of a computer system in Embodiment 1.

FIG. 1 is a diagram showing an entire configuration of a computer system in Embodiment 1. The computer system shown in FIG. 1 can be broadly divided into constituents of hardware 10 and constituents of software 20. Here, the "system" refers to an object formed by logically assembling a plurality of devices (functions). It does not matter whether the devices (functions) of the constituents are present in the same cabinet. Hence, for example, there is a case where these constituents are assembled into an apparatus and the apparatus becomes one object to be traded. Moreover, there is also a case where a specific constituent is dealt with as a single body in another cabinet. A concept of the "system" in a computer system in Embodiment 2 (to be described later) is similar to that of the above.

The hardware 10 includes a hard disk drive (HDD) 11 that is a non-volatile storage device for retaining an operating system (OS)/user data, and a memory 12 that is a storage device for copying a Protected Area Run Time Interface Extension Services (PARTIES) partition. In order to meet a PARTIES specification, the HDD 11 supports a specification of AT Attachment (ATA)/Advanced Technology Attachment Packet Interface (ATAPI)-5. This HDD 11 includes an area freely accessible by a user, that is, an area operating in a user environment (a normal partition), and a system partition, that is, a PARTIES partition that is an area protected and hidden from a user. Moreover, the memory 12 is formed of a RAM and the like, and is used as a virtual PARTIES application area (to be described later).

The software 20 includes a basic input/output system (BIOS) 21 which controls a variety of devices connected to the computer system, a host protected area 22 that is an area (PARTIES area) provided by a system vendor providing the computer system and protected from a user, and a user area 24 that is an area operating in the user environment. In the host protected area 22, a PARTIES application 23 that is a bootable application and a service provided by the system vendor is stored.

Moreover, the software 20 includes a PARTIES application access module 25 which determines whether or not the PARTIES application 23 is one that has been write-protected, and a virtual PARTIES application area 26 that is a work area where the PARTIES application 23 is copied onto the memory 12. Besides the role described above, the PARTIES application access module 25 has a role of searching and securing an unoccupied area on the memory 12, a role of copying the PARTIES application 23 onto the memory 12 and creating the virtual PARTIES application area 26, and a role of accessing the virtual PARTIES application area 26 when the PARTIES application 23 is accessed.

The BIOS 21 supports a specification of the PARTIES application 23 and a boot from the PARTIES partition. Moreover, the BIOS 21 includes a function to manage a private key as well as a function to support a validation of the PARTIES application 23 for a system vendor authentication. Furthermore, the BIOS 21 includes a function to execute an access management to the host protected area 22.

Next, the write protection in the PARTIES partition will be described.

Figure 2:
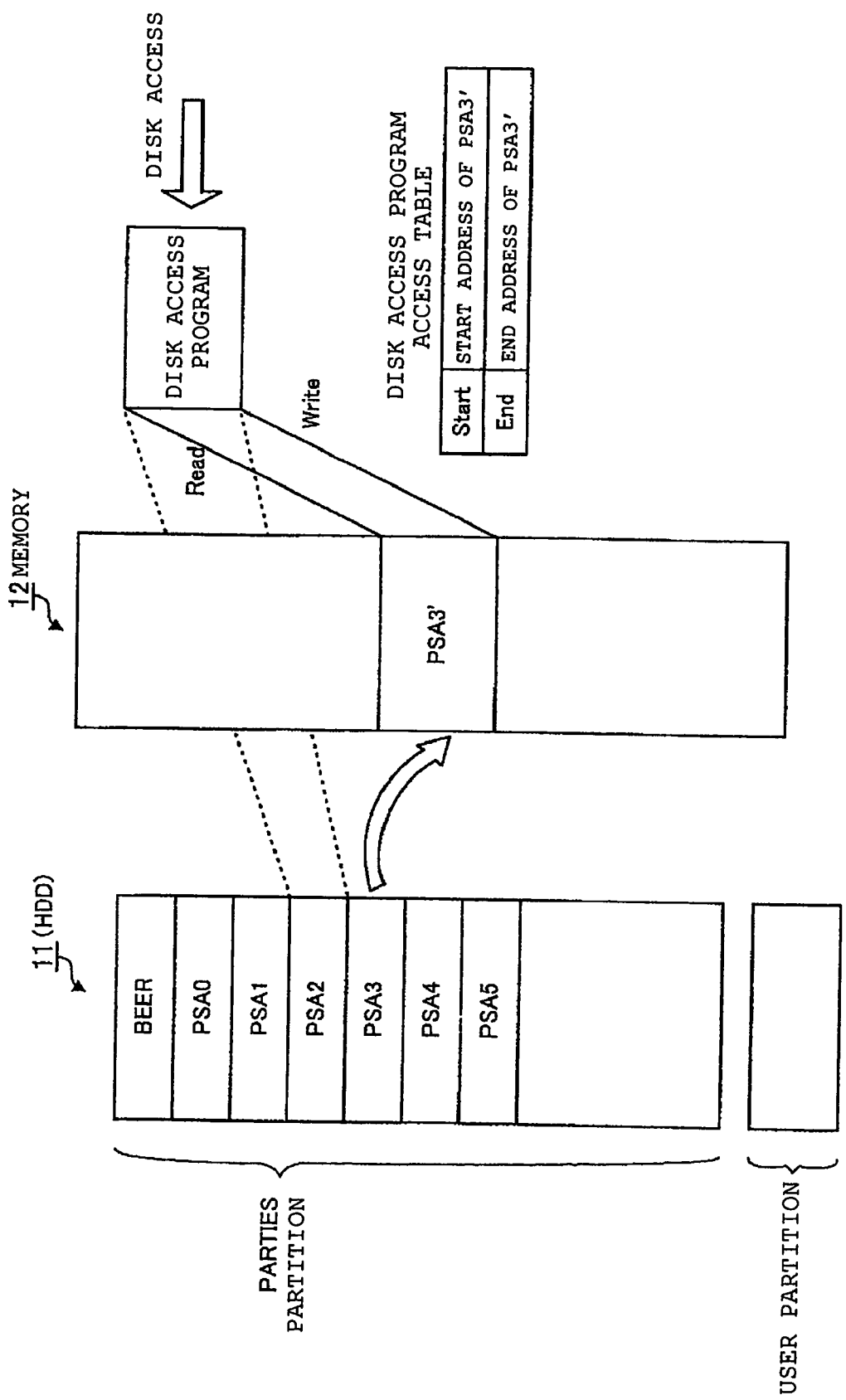
FIG. 2 is a diagram for explaining a write protection method in Embodiment 1.

FIG. 2 is a diagram for explaining a write protection method in Embodiment 1. Here, when the boot is performed, in conformity with an Interrupt 40 (INT 40) that is a disk access program, a disk access is executed from the BIOS 21 for the HDD 11 which has the PARTIES partition that is a protected secure area. An area of the PARTIES partition, which is generated by PARTIES as an area hidden from a user in the HDD 11, cannot usually be touched after once being booted from the user environment. Specifically, data in the PARTIES partition will not be broken by the user environment or an access is not made thereto because the PARTIES partition is a secured partition. Consequently, it is also possible to prevent an invasion of virus and the like. In the example shown in FIG. 2, BEER that is a header and PSA0 to PSA5 that are PARTIES applications are stored in the PARTIES partition.

As services and tools, which are provided by the system vendor and must be protected from a user, the following applications and the like are stored in the PARTIES partition, which are:

Diagnostic Service;
OS Recovery Service;
Restore from Backup Service;
Create Diagnostic Diskettes Service;
Download BIOS Service;
Download Drivers Service;
Update BIOS Service; and
Administrator tools.

However, when the PARTIES partition is accessed, for example, by the INT 40 of the BIOS 21, if the application present in the area of the PARTIES partition is made to run, then the application cannot be locked, and the write thereto is usually enabled. In the case of booting, the validation is performed for the application present in the area of the PARTIES partition by use of the private key owned by the BIOS 21. However, if the application on the PARTIES partition is changed, an error occurs in the validation, and the boot fails.

Accordingly, in Embodiment 1, all of the applications to be executed are developed on the memory 12 such as the RAM and made to access a virtual disk space, and the write protection to the PARTIES partition is realized. In the example shown in FIG. 2, the application PSA3 is once developed in the memory 12. In this case, for example, the application PSA3 is stored in a predetermined area of the memory 12, and in an access table of a disk access program, a start address of an application PSA3' in the memory 12, which corresponds to a start of the access, and an end address of the application PSA3' in the memory 12, which corresponds to an end of the access, are stored. In such a way, a change is made such that both read and write are performed for the application PSA3' on the memory 12. Thus, the access is made to the virtual disk space, and the write protection to the PARTIES partition is realized.

Figure 3:
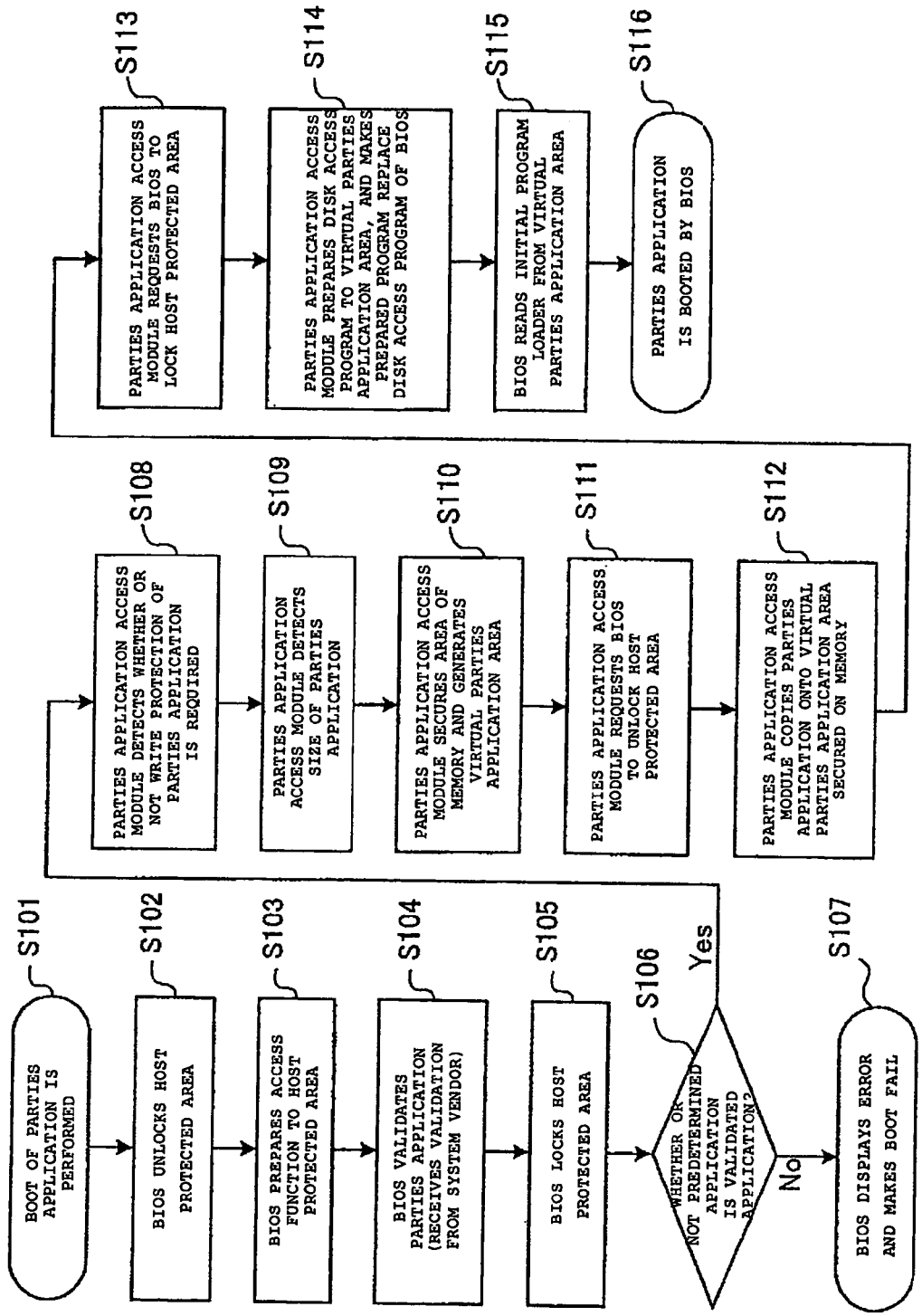
FIG. 3 is a flowchart showing a flow of a boot of a PARTIES application in Embodiment 1.

FIG. 3 is a flowchart showing a flow of the boot of the PARTIES application in Embodiment 1. When the boot of the PARTIES application is executed (Step 101), the BIOS 21 first unlocks the host protected area 22 (Step 102). Next, the BIOS 21 prepares an access function to the host protected area 22 (Step 103). Specifically, the BIOS 21 prepares a routine of the disk access. Thereafter, the BIOS 21 validates the PARTIES application 23. Specifically, the PARTIES application 23 receives a validation from the system vendor, for example, by means of a hash value (Step 104). Then, the BIOS 21 locks the host protected area 22 (Step 105). Here, in the BIOS 21, it is determined whether or not a predetermined application is the validated application (Step 106). If the application is not the validated application, the BIOS 21 displays an error and makes the boot fail (Step 107). If it is determined in Step 106 that the application is the validated application, this boot process proceeds to Step 108.

The PARTIES application access module 25 detects whether or not the write protection of the PARTIES application 23 is required (Step 108). Then, the PARTIES application access module 25 detects a size of the PARTIES application 23 (Step 109). Subsequently, the PARTIES application access module 25 secures an area of the memory 12, and generates the virtual PARTIES application area 26 (Step 110). Then, the PARTIES application access module 25 requests the BIOS 21 to unlock the host protected area 22 (Step 111). The PARTIES application access module 25 copies the PARTIES application 23 onto the virtual PARTIES application area 26 secured on the memory 12 (Step 112). Thereafter, the PARTIES application access module 25 requests the BIOS 21 to lock the host protected area 22 (Step 113). In such a way, the write protection of the PARTIES application 23 on the PARTIES partition is made possible.

Then, the PARTIES application access module 25 prepares an access function (disk access program) to the virtual PARTIES application area 26, and makes the prepared access function replace the disk access program prepared by the BIOS 21 (Step 114). Thereafter, the BIOS 21 reads an initial program loader, which is a first code for the boot, from the virtual PARTIES application area 26 (Step 115), and the boot of the PARTIES application 23 by the BIOS 21 is executed (Step 116).

As described above in detail, this embodiment is configured such that all of the applications in the HDD 11 to be executed are developed in the memory 12 such as the RAM, and that the BIOS 21 accesses the virtual disk space. In such a way, it is made possible to use a normal application as the application for the PARTIES partition under a state where the write protection to the PARTIES partition has been realized.

(Embodiment 2)

In Embodiment 1, the PARTIES application 23 is copied onto the virtual PARTIES application area 26 secured on the memory 12 such as the RAM, and thus the write protection to the PARTIES partition is realized. In Embodiment 2, the virtual PARTIES application area 26 is copied onto an area secured on the host protected area 22, and thus the write protection is realized. Note that the same reference numerals will be used for the same functions as those in Embodiment 1, and detailed description thereof will be omitted here.

Figure 4:
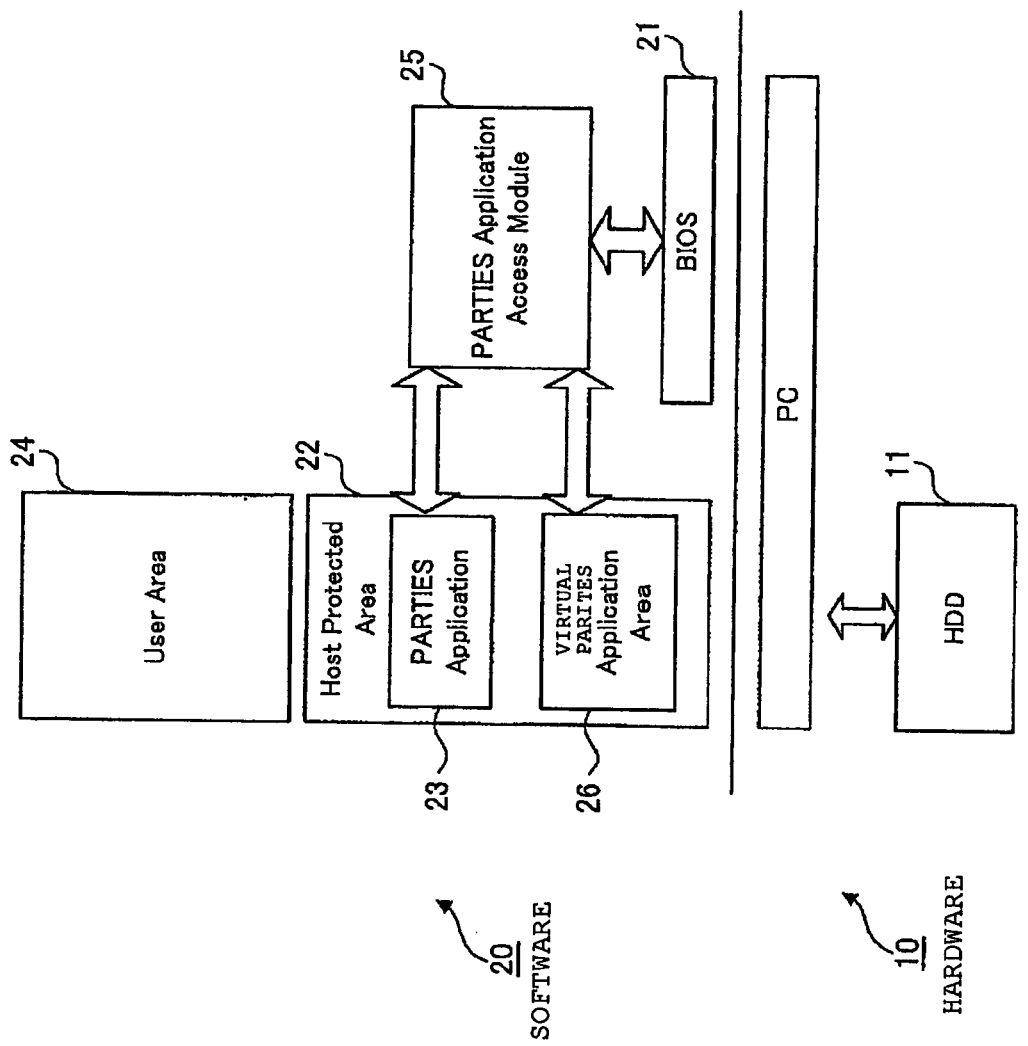
FIG. 4 is a diagram showing an entire configuration of a computer system in Embodiment 2.

FIG. 4 is a diagram showing an entire configuration of a computer system in Embodiment 2. With regard to the configuration of the hardware 10, the memory 12 shown in FIG. 1 is not used for copying the PARTIES application 23, and therefore, FIG. 4 excludes the memory 12. Moreover, with regard to the configuration of the software 20, Embodiment 2 is different from Embodiment 1 in that the virtual PARTIES application area 26 is copied onto an unoccupied area of the host protected area 22. Due to such a difference in the configuration, the PARTIES application access module 25 has a role of copying the PARTIES application 23 onto the unoccupied area of the host protected area 22 to generate the virtual PARTIES application area 26. This role is one that replaces the role to copy the PARTIES application 23 onto the memory 12 to generate the virtual PARTIES application area 26, which has been described with reference to FIG. 1.

Next, a write protection in the PARTIES partition will be described.

Figure 5:
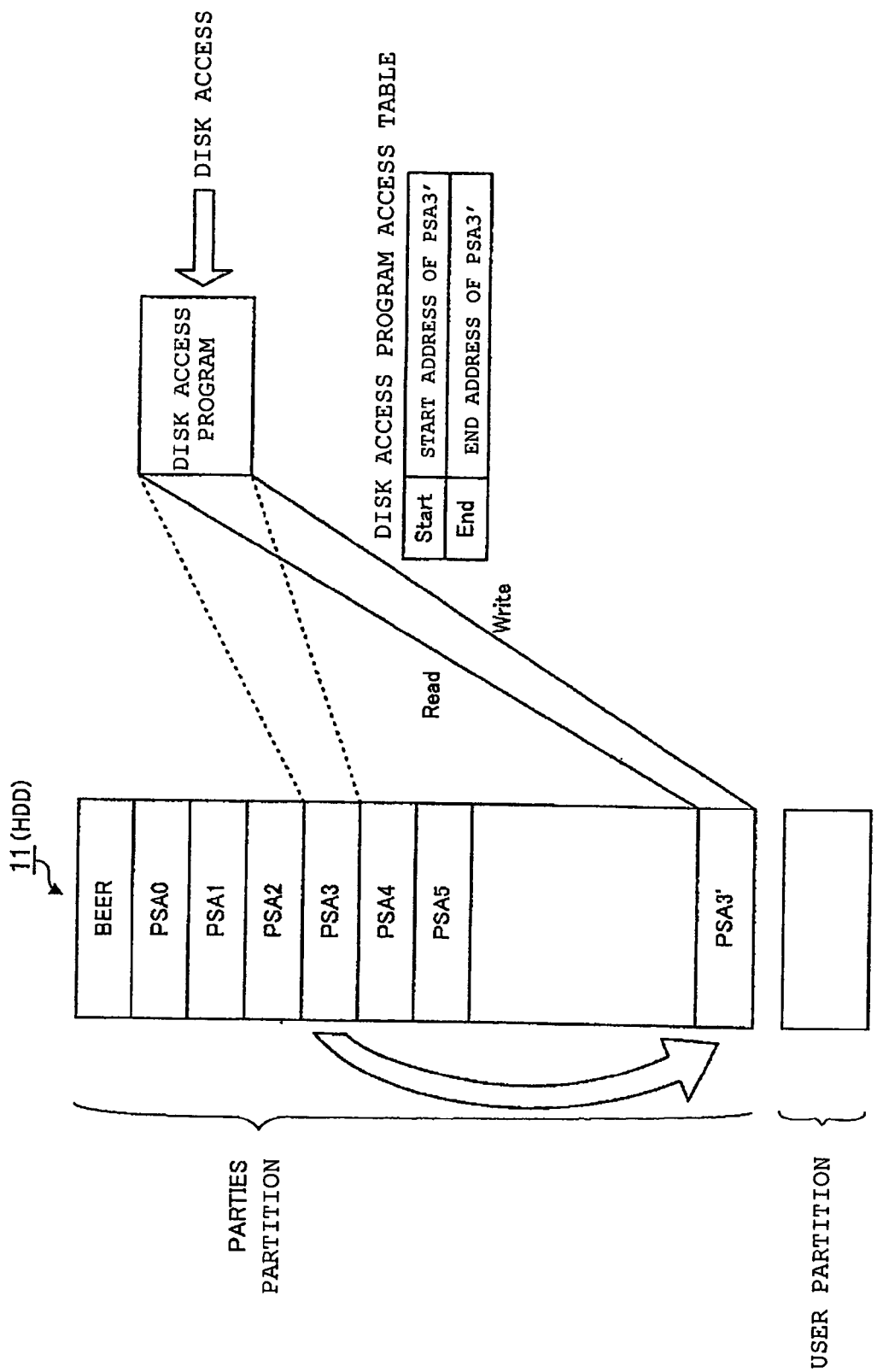
FIG. 5 is a diagram for explaining a write protection method in Embodiment 2.

FIG. 5 is a diagram for explaining a write protection method in Embodiment 2. Here, in the case of performing the boot, a disk access is executed in conformity with the Interrupt 40 (INT 40) from the BIOS 21 for the HDD 11 having the PARTIES partition that is the protected secure area. Similarly to the example shown in FIG. 2, BEER that is the header and PSA0 to PSA5 that are the PARTIES applications are stored in the PARTIES partition. This PARTIES partition has an area unused for the applications (unoccupied area) as well as an area used for the applications.

In Embodiment 2, this area unused for the applications is used, all of the applications to be executed are copied thereonto, and an access is made by the INT 40 to such a portion onto which the applications have been copied. The example shown in FIG. 5 is configured such that the application PSA3 is copied onto another PARTIES partition (application PSA3') for which the write protection is not required, and that an access table of a disk access program is changed to direct an access range of the disk access program toward an area onto which the application PSA3 has been copied. For this area which has accepted the copy, read and write will be executed. Specifically, in the access table of the disk access program, a start address of the application PSA3' in the host protected area 22, which corresponds to a start of the access, and an end address of the application PSA3' in the host protected area 22, which corresponds to an end of the access, are stored. In such a way, a change is made such that both of the read and write are performed for the application PSA3' of the virtual PARTIES application area 26, which has been formed in the unoccupied area of the host protected area 22. Then, the access is made to the virtual disk space, and the write to the original application PSA3 is limited. That is, the write protection to the PARTIES partition is realized.

Figure 6:
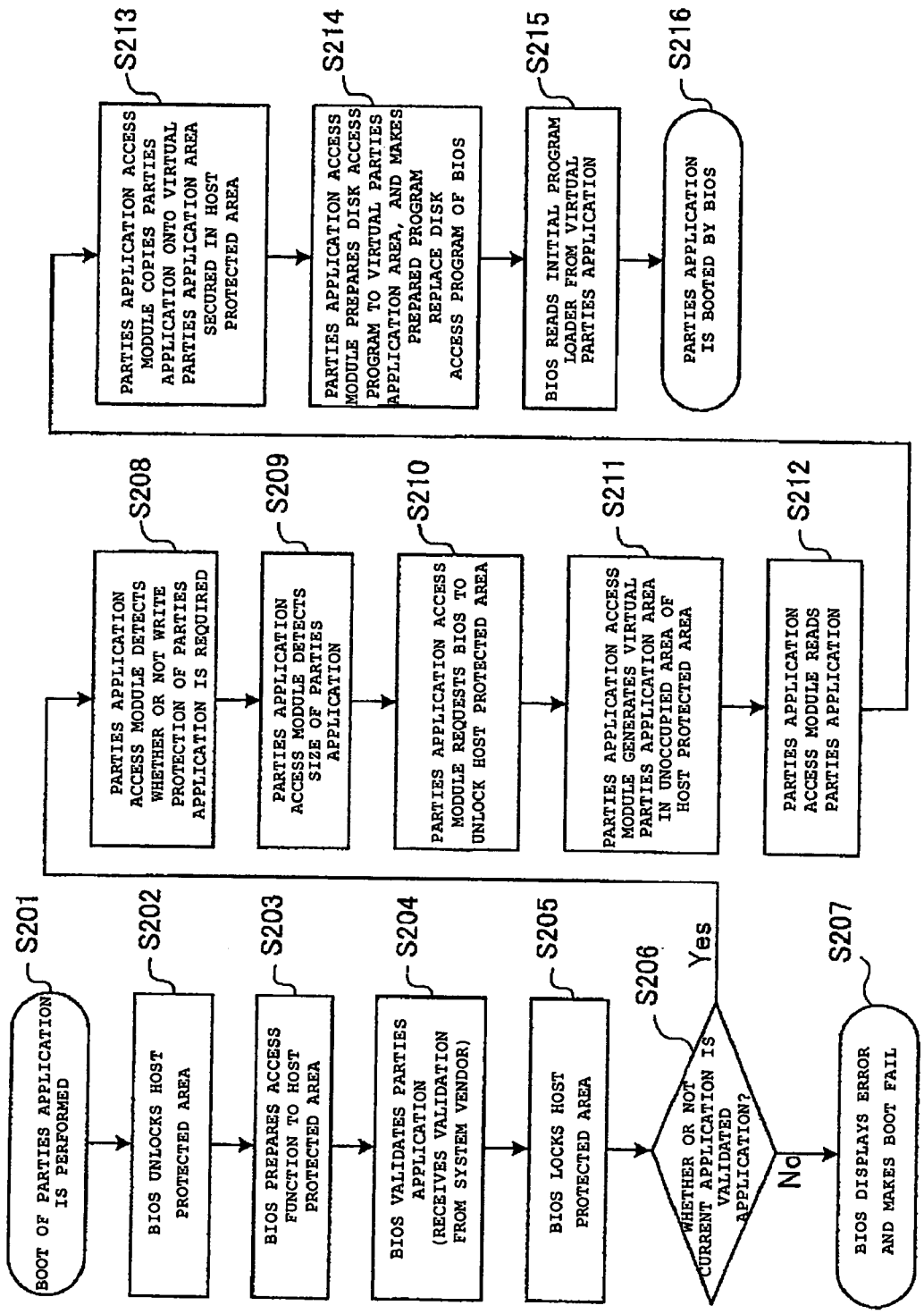
FIG. 6 is a flowchart showing a flow of a boot of a PARTIES application in Embodiment 2.
Figure 7:
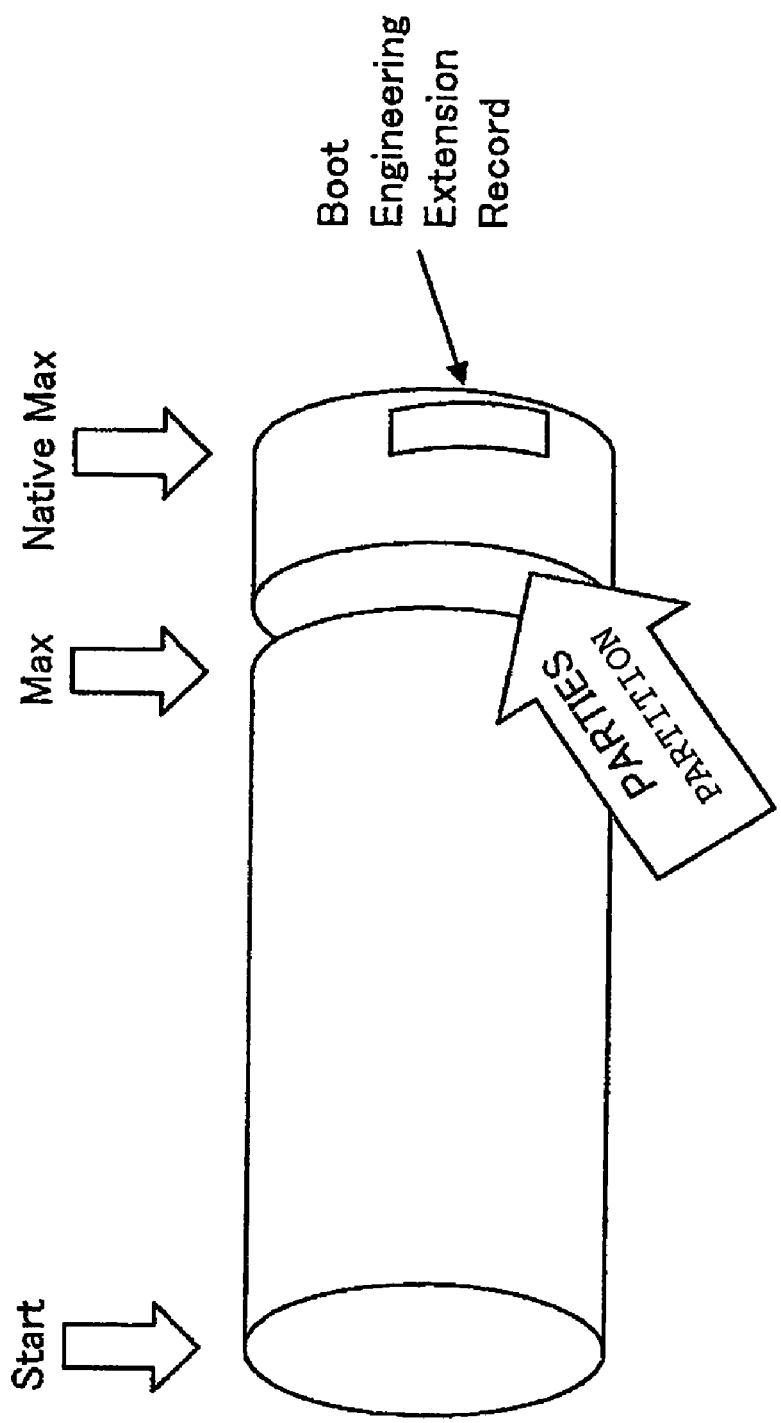
FIG. 7 is a diagram for explaining a function of PARTIES in an HDD.

FIG. 6 is a flowchart showing a flow of the boot of the PARTIES application in Embodiment 2. When the boot of the PARTIES application is executed (Step 201), the BIOS 21 first unlocks the host protected area 22 (Step 202), and the BIOS 21 prepares an access function (disk access program) to the host protected area 22 (Step 203). Next, the BIOS 21 validates the PARTIES application 23. Specifically, the PARTIES application 23 receives a validation by the system vendor (for example, validation by means of a hash value) (Step 204). Then, the BIOS 21 locks the host protected area 22 (Step 205). Here, in the BIOS 21, it is determined whether or not a predetermined application is the validated application (Step 206). If the application is not the validated application, the BIOS 21 displays an error and makes the boot fail (Step 207). If it is determined in Step 206 that the application is the validated application, this boot process proceeds to Step 208.

The PARTIES application access module 25 detects whether or not the write protection of the PARTIES application 23 is required (Step 208). Next, the PARTIES application access module 25 detects a size of the PARTIES application 23 (Step 209). Here, the PARTIES application access module 25 requests the BIOS 21 to unlock the host protected area 22 (Step 210). Thereafter, the PARTIES application access module 25 generates the virtual PARTIES application area 26 in the unoccupied area of the host protected area 22 (Step 211).

Next, the PARTIES application access module 25 reads the PARTIES application 23 (Step 212), and copies the PARTIES application 23 onto the virtual PARTIES application area 26 secured in the host protected area 22 (Step 213). Subsequently, the PARTIES application access module 25 prepares an access function (disk access program) to the virtual PARTIES application area 26 copied onto the host protected area 22, and makes the prepared access function replace the disk access program prepared by the BIOS 21 (Step 214). Thereafter, the BIOS 21 reads an initial program loader that is a first code for the boot from the virtual PARTIES application area 26 (Step 215), and the boot of the PARTIES application 23 by the BIOS 21 is executed (Step 216).

As described above, Embodiment 2 is configured such that, in the case of executing the application (PARTIES application 23) introduced into the PARTIES partition, the PARTIES partition into which the above-described application is introduced is once copied onto another PARTIES partition for which the write protection is not required. Then, the access to the original area is changed to be the access to the area onto which the application has been copied. More specifically, as shown in FIG. 5, with regard to the address of the access table to the application, the address of the virtual PARTIES application area 26 is changed to the address of the copy destination. In such a way, the access to the original area can be eliminated, and the protection of the PARTIES partition desired to be write-protected is realized.

As described above in detail, according to these Embodiments, the write limitations on the PARTIES partition are realized, and the normal application can be used as the application for the PARTIES partition. In this case, it is not necessary to change or develop the application for the PARTIES partition. Specifically, it is made possible to perform the write limitations even if the application on the PARTIES partition does not attempt to limit the write thereto. Moreover, it becomes unnecessary to deal with unexpected write. Furthermore, it is made possible to expand a usable range of the PARTIES specification.

As described above, according to the present invention, for example, in the storage device such as the HDD, the write protection to the application stored in the area hidden from a user can be realized.

In the drawings and specifications there has been set forth a preferred embodiment of the invention and, although specific terms are used, the description thus given uses terminology in a generic and descriptive sense only and not for purposes of limitation.

We claim as our invention:

1. Apparatus comprising:
a storage device for retaining data, wherein the storage device includes:
a first partition which operates in a user environment; and
a second partition different from the first partition, the second partition storing
applications requiring write protection,
wherein the second partition includes an unoccupied area onto which a specific application already stored in the second partition is copied when the specific application is executed from among the applications requiring write protection.

2. Apparatus of claim 1, wherein the second partition is a Protected Area Run Time Interface Extension Services (PARTIES) partition.

3. Apparatus of claim 1, wherein a boot from the second partition in the storage device is executed with support of a basic input/output system (BIOS).

4. Apparatus comprising:
an external storage device which is able to form a first area operating in a user environment and a second area which is a user-hidden area;
a basic input/output system (BIOS) which supports the booting of a predetermined application among applications stored in the second area; and
a memory coupled to the external storage device and the BIOS, the memory stores code which operates on the external storage device and the BIOS when executed, wherein the stored code includes:
validation code which validates the predetermined application for a system vendor authentication; and
virtual application area forming code which copies the predetermined application onto an unoccupied area within the second area, and which forms a virtual application area when the predetermined application is the validated application,
wherein an access to the predetermined application is performed in the virtual application area.

5. Apparatus of claim 4, wherein the virtual application area forming code, in forming the virtual application area, detects the size of the predetermined application and searches and secures the unoccupied area.

6. Apparatus of claim 4, wherein the virtual application area forming code, in forming the virtual application area, detects the size of the predetermined application, requests the BIOS to unlock the second area, and then forms the virtual application area in the second area.

7. Apparatus comprising:
a storage device which is divided into a user area operating in a user environment and a user unavailable host protected area;
a basic input/output system (BIOS) which supports a boot from the host protected area and supports a validation of an application in the host protected area which includes a system vendor authentication; and
an application access module coupled to the storage device and the BIOS, the application access module copies the application in the host protected area onto an unoccupied area of the host protected area to generate a virtual application area.

8. Apparatus of claim 7, wherein the BIOS manages a private key and an access to the host protected area.

9. Apparatus of claim 7, wherein the BIOS manages any one of a private key and an access to the host protected area.

10. Apparatus of claim 7, wherein the application access module determines whether the application in the host protected area is one that has been write-protected, and when the application is accessed, accesses the virtual application area.

11. A method comprising:
unlocking a second area when booting a validated application in the second area of a storage device having a first area which operates in a user environment and the second area which is an area hidden from a user;
reading the application from the unlocked second area;
copying the read application onto a virtual application area provided in an unoccupied area in the second area; and
reading a first code for booting the application from the virtual application area.

12. The method of claim 11, wherein said reading of the first code includes reading the first code from the virtual application area by directing an access range of a disk access program toward an area onto which the application has been copied.

13. A product comprising:
a computer readable medium having computer readable program code stored therein, the computer readable program code in the product being effective to:
request unlocking of a second area of a storage device having a first area that is an operating environment for a user and the second area that is an area hidden from the user;
read, from the unlocked second area, an application which is validated by a system vendor and requires a write protection;
copy the read application onto a virtual application area provided in an unoccupied area of the second area; and
direct an access to the application toward the virtual application area.

14. The product of claim 13, wherein the code which directs the access to the application toward the virtual application area changes an address of an access table for the application to an address of a copy destination.

15. The product of claim 13, wherein the code is further effective to boot the application from the virtual application area.

* * * * *